US009164204B2

(12) United States Patent
Kodama et al.

(10) Patent No.: US 9,164,204 B2
(45) Date of Patent: *Oct. 20, 2015

(54) ANTI-GLARE FILM, MANUFACTURING METHOD FOR SAME, POLARIZING PLATE AND IMAGE DISPLAY DEVICE

(71) Applicant: Dai Nippon Printing Co., Ltd., Tokyo (JP)

(72) Inventors: Takashi Kodama, Tokyo (JP); Makoto Honda, Tokyo (JP); Hiroko Suzuki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/314,668

(22) Filed: Jun. 25, 2014

(65) Prior Publication Data
US 2014/0307316 A1    Oct. 16, 2014

Related U.S. Application Data

(63) Continuation of application No. 13/635,604, filed as application No. PCT/JP2011/056470 on Mar. 17, 2011.

(30) Foreign Application Priority Data

Mar. 18, 2010 (JP) ................................ 2010-063331

(51) Int. Cl.
*G02B 5/02* (2006.01)
*G02B 5/30* (2006.01)
(Continued)

(52) U.S. Cl.
CPC *G02B 5/02* (2013.01); *G02B 1/111* (2013.01); *G02B 5/0221* (2013.01);
(Continued)

(58) Field of Classification Search
CPC .... G02B 1/111; G02B 5/0242; G02B 5/0268; G02B 5/0278; G02B 5/30; G02F 1/133502; G02F 1/133504; G02F 1/133528
USPC ............... 359/487.01, 599, 601, 900, 488.01; 349/96, 112, 137; 427/508, 162, 163.1, 427/164
See application file for complete search history.

(56) References Cited

U.S. PATENT DOCUMENTS 6,217,176 B1 * 4/2001 Maekawa ...................... 359/601
6,502,943 B2 * 1/2003 Nakamura et al. ............ 359/603
(Continued)

FOREIGN PATENT DOCUMENTS

CN    101268389 A    9/2008
JP    6-018706 A    1/1994
(Continued)

Primary Examiner — Ricky D Shafer
(74) Attorney, Agent, or Firm — Novak Druce Connolly Bove + Quigg LLP

(57) ABSTRACT

Provided is an anti-glare film having excellent anti-glare property, and suppressing white muddiness and scintillation, generation of cracks when attaching the films to polarizing elements and a fabrication process of liquid crystal cells, and changes of an anti-glare property over time. An anti-glare film comprises a light-transmitting substrate; and a diffusion layer having a surface roughness and provided on at least one surface of the light-transmitting substrate, in which the diffusion layer is obtainable by applying, on the at least one surface of the light-transmitting substrate, a coating composition including organic fine particles and a radiation curable binder that includes a (meth)acrylate monomer as an essential component, drying the composition to form a coating, and curing it, the organic fine particles in the diffusion layer have an impregnation layer being impregnated with the radiation curable binder, and the impregnation layer has an average thickness of 0.01 to 1.0 μm.

19 Claims, 3 Drawing Sheets

(51) Int. Cl.
*G02B 27/00* (2006.01)
*G02F 1/1335* (2006.01)
*G02B 1/111* (2015.01)

(52) U.S. Cl.
CPC ........... *G02B 5/0242* (2013.01); *G02B 5/0268* (2013.01); *G02B 5/0278* (2013.01); *G02B 5/30* (2013.01); *G02F 1/133502* (2013.01); *G02F 1/133504* (2013.01); *G02F 1/133528* (2013.01)

(56) References Cited

U.S. PATENT DOCUMENTS

| | | | |
|---|---|---|---|
| 6,852,376 B2 * | 2/2005 | Chien et al. | 428/1.3 |
| 6,992,827 B2 * | 1/2006 | Sakai et al. | 359/599 |
| 7,167,222 B2 * | 1/2007 | Inoue et al. | 349/112 |
| 7,538,335 B1 | 5/2009 | Leard | |
| 7,567,383 B2 * | 7/2009 | Nagahama et al. | 359/599 |
| 2007/0103786 A1 * | 5/2007 | Muramatsu | 359/599 |
| 2007/0229804 A1 | 10/2007 | Inoue et al. | |
| 2007/0268587 A1 | 11/2007 | Ninomiya et al. | |
| 2008/0030861 A1 | 2/2008 | Ookubo et al. | |
| 2009/0142562 A1 | 6/2009 | Miyagawa et al. | |

FOREIGN PATENT DOCUMENTS

| | | |
|---|---|---|
| JP | 06-347616 A | 12/1994 |
| JP | 10-020103 A | 1/1998 |
| JP | 2005-281476 A | 10/2005 |
| JP | 2006-113561 A | 4/2006 |
| JP | 2006-154791 A | 6/2006 |
| JP | 2007-249191 A | 9/2007 |
| JP | 2008-209855 A | 9/2008 |
| JP | 2009-265341 A | 11/2009 |
| JP | 2009-271255 A | 11/2009 |
| TW | 200730886 | 8/2007 |
| TW | 200808883 A | 2/2008 |
| WO | WO-2006030949 A1 | 3/2006 |

\* cited by examiner

ANTI-GLARE FILM, MANUFACTURING METHOD FOR SAME, POLARIZING PLATE AND IMAGE DISPLAY DEVICE

CROSS REFERENCE TO RELATED APPLICATIONS

This application is a continuation of co-pending U.S. application Ser. No. 13/635,604, which is the National Phase filing under 35 U.S.C. §371 of PCT/JP2011/056470 filed on Mar. 17, 2011; and this application claims priority to Application No. 2010-063331 filed in Japan on Mar. 18, 2010 under 35 U.S.C. §119; the entire contents of all are hereby incorporated by reference.

TECHNICAL FIELD

The present invention relates to an anti-glare film, a method for producing the anti-glare film, a polarizer, and an image display device.

BACKGROUND ART

Image display devices such as cathode ray tubes (CRTs), liquid crystal display devices (LCDs), plasma display devices (PDPs), electroluminescence display devices (ELDs), and electronic paper are generally provided with optical laminated bodies for antireflection on the outermost surface thereof. Such optical laminated bodies for antireflection suppress reflection of images and decrease the reflectivity by light diffusion or interference of light.

As one of such antireflection optical laminated bodies, an anti-glare film including an anti-glare layer that has a surface roughness and is provided on a surface of a transparent substrate is known. Such a surface roughness of an anti-glare film diffuses ambient light, whereby a decrease in visibility can be prevented.

Conventional anti-glare films are known in which anti-glare layers formed by applying resins containing filler such as silicon dioxide (silica) on surfaces of transparent base films (see, for example, Patent Literatures 1 and 2).

For example, in such anti-glare films, a surface roughness is formed by adding cohesive particles, an inorganic filler and/or an organic filler in a resin; laminating a film with unevenness on an anti-glare layer; and phase separation using compatibility among compounds such as two or more different polymers, which constitute a binder.

In all such conventional anti-glare films, a light diffusion function and an anti-glare function are obtained by the effect of a surface shape of the anti-glare layer. In order to increase such an anti-glare function, the size of the surface roughness needs to be increased. However, the large-sized projection and depression increases a haze of a coating, whereby white muddiness is generated.

Further, the twinkling brightness which is called scintillation is generated on the surfaces of conventional anti-glare films, which results in a decrease in visibility of display screens.

In recent years, high definition liquid crystal displays have been developed. However, scintillation is generated in such high definition liquid crystal displays when conventional anti-glare films are used therein. Such scintillation is a serious problem.

Furthermore, in the conventional anti-glare films, cracks are generated during a process for adhering the films to polarizing elements or a fabrication process of liquid crystal cells, at, for example, an interface between light-transmitting fine particles and a light-transmitting resin that are included in an anti-glare layer. Furthermore, in the conventional anti-glare films, anti-glare performance and a scintillation state are changed over time due to the haze variation in response to temperature and moisture changes. Therefore, the conventional anti-glare films are less resistant to moisture and heat.

Patent Literature 3 discloses an anti-glare material obtainable by mixing a binder resin with resin beads in which 70% or more thereof is swollen with a solvent.

In an anti-glare film provided with an anti-glare layer including such resin beads that are previously swollen with a solvent, the adhesion at the interface between the resin beads and the binder resin is expected to be improved. Such an anti-glare film is expected to be used in high definition displays.

In such an anti-glare film provided with an anti-glare layer including resin beads that are previously swollen with a solvent, the adhesion at the interface between the swollen resin beads and the binder resin in the anti-glare layer is improved only by an anchor effect created at the interface. Therefore, the adhesion and the like can be further improved.

Patent Literature 4 discloses a method for producing a light diffusion film in which the density of light-transmitting fine particles, a coating composition, and the average particle size of light-transmitting fine particles are in a specific relation to one another. Patent Literature 5 discloses an optical film including light-transmitting particles having a certain average particle size that depends on the thickness of a light diffusion layer. Patent Literature 6 discloses an optical film including an anti-glare layer formed from a coating composition in which a binder and two types of resin fine particles different in particle sizes and swelling rates that satisfy a certain relation with each other are dispersed in a dispersion. Patent Literature 7 discloses a method for producing a light diffusion film, including a coating composition for a light diffusion layer. The coating composition includes light-transmitting fine particles, a light-transmitting resin containing a certain amount of a light-transmitting polymer with a molecular weight of 1000 or more, and a solvent.

However, Patent Literatures 4 to 7 do not disclose at all that light-transmitting fine particles are impregnated with a binder, and do not disclose at all, either the effect exerted by the impregnation of light-transmitting fine particles with a binder. Therefore, the anti-glare films disclosed in the patent literatures do not sufficiently achieve an anti-glare property, prevention of white muddiness, and prevention of scintillation.

Therefore, in conventional anti-glare films, generation of cracks at the interface between resin beads and a binder resin is required to be prevented at a high level in a process for attaching the films to polarizing elements and a fabrication process of liquid crystal cells. Furthermore, white muddiness is required to be reduced by reducing reflection at the interface between a binder and resin beads and scintillation is also required to be prevented by appropriately dispersing resin beads.

CITATION LIST

Patent Literature

Patent Literature 1: JP-A Hei-6-18706
Patent Literature 2: JP-A Hei-10-20103
Patent Literature 3: JP-A 2005-281476
Patent Literature 4: JP-A 2006-113561
Patent Literature 5: JP-A 2007-249191
Patent Literature 6: JP-A 2009-271255
Patent Literature 7: JP-A 2006-154791

SUMMARY OF INVENTION

Technical Problem

The present invention has been made in view of the above-described state of the art. The present invention aims to provide an anti-glare film having an excellent anti-glare property, sufficiently suppressing white muddiness and scintillation, even if the film is used in a high definition display, and further suppressing changes of an anti-glare property and the like over time and generation of cracks in a process for attaching the films to polarizing elements and a fabrication process of liquid crystal cells. The present invention further aims to provide a method for producing the anti-glare film, a polarizing plate and an image display device using the anti-glare film.

Solution to Problem

The present invention is an anti-glare film, comprising: a light-transmitting substrate; and a diffusion layer having a surface roughness and provided on at least one surface of the light-transmitting substrate, wherein the diffusion layer is obtainable by applying, on the at least one surface of the light-transmitting substrate, a coating composition including organic fine particles (A) and a radiation curable binder that includes a (meth)acrylate monomer as an essential component, diving the coating composition to form a coating, and curing the coating, the organic fine particles (A) in the diffusion layer each have an impregnation layer that is impregnated with the radiation curable binder, and the impregnation layer has an average thickness of 0.01 to 1.0 µm.

In the anti-glare film of the present invention, a haze variation during a 60° C., 90% RH, 1000-hour moisture and heat resistance test is preferably 1.5% or less.

The diffusion layer preferably further includes fine particles (B) with an average particle size of smaller than the average particle size of the organic fine particles (A).

The coating composition used for the anti-glare film of the present invention preferably includes at least a solvent that swells the organic fine particles (A).

Further, $\Delta_A$ and $\Delta_B$ preferably satisfy the formula (1):

$$|\Delta_A| < |\Delta_B| \quad (1)$$

wherein $\Delta A$ represents a difference between a refractive index of the radiation curable binder and a refractive index of the organic fine particles (A) and $\Delta_B$ represents a difference between a refractive index of the radiation curable binder and a refractive index of the fine particles (B).

Further, $D_A 1$ and $D_A 2$ preferably satisfy the formula (2):

$$0.01 \, \mu m < D_A 2 - D_A 1 < 1.0 \, \mu m \quad (2)$$

wherein $D_A 1$ represents an average particle size of the organic fine particles (A) and $D_A 2$ represents an average particle size of the organic fine particles (A) in the diffusion layer.

Further, $D_A 1$, $D_B 1$, $D_A 2$, and $D_B 2$ preferably satisfy the formula (3):

$$1.0 \, \mu m > D_A 2 - D_A 1 > D_B 2 - D_B 1 \geq 0 \quad (3)$$

wherein $D_A 1$ represents an average particle size of the organic fine particles (A), $D_B 1$ represents an average particle size of the fine particles (B), $D_A 2$ represents an average particle size of the organic fine particles (A) in the diffusion layer, and $D_B 2$ represents an average particle size of the fine particles (B) in the diffusion layer.

In the anti-glare film of the present invention, the fine particles (B) are preferably organic fine particles.

The diffusion layer preferably further includes a lamellar inorganic compound. The lamellar inorganic compound is preferably talc.

It is preferable that the diffusion layer has projections at positions corresponding to the organic fine particles (A) in the surface of the diffusion layer, the projections having a height lower than the height of projections at positions corresponding to organic fine particles (C) in the surface of a diffusion layer (C), wherein the diffusion layer (C) satisfy all the following requirements (1), (2), and (3):

Requirement (1): the diffusion layer (C) is formed in the same conditions as the diffusion layer containing the organic fine particles (A), except that the organic fine particles (C) are used instead of the organic fine particles (A);

Requirement (2): the average particle size of the organic fine particles (C) in the diffusion layer (C) is the same as the average particle size of the organic fine particles (A) in the diffusion layer; and Requirement (3): no impregnation layer is formed in each of the organic fine particles (C) in the diffusion layer (C).

The present invention is also a method for producing an anti-glare film that includes a light-transmitting substrate and a diffusion layer having a surface roughness and provided on least one surface of the light-transmitting substrate, the method comprising forming the diffusion layer by applying, on the at least one surface of the light-transmitting substrate, a coating composition including organic fine particles (A), a radiation curable binder that includes a (meth)acrylate monomer as an essential component, and a solvent; drying the coating composition to form a coating; and curing the coating, the radiation curable binder and/or the solvent including a component that swells the organic fine particles (A), the organic fine particles (A) each having an impregnation layer that is impregnated with the radiation curable binder and has an average thickness of 0.01 to 1.0 µm.

The present invention is also a polarizer provided with a polarizing element. The polarizer comprises the anti-glare film of the present invention provided on a surface of the polarizing element.

The present invention is also an image display device comprising, the anti-glare film of the present invention or the polarizer of the present invention on the outermost surface of the image display device.

The present invention will be described in detail below.

The anti-glare film of the present invention includes a light-transmitting substrate and a diffusion layer having a surface roughness and provided on at least one surface of the light-transmitting substrate.

The light-transmitting substrate is preferably excellent in smoothness, heat resistance, and mechanical strength. Specific examples of materials for the light-transmitting substrate include polyester (polyethylene terephthalate, polyethylene naphthalate), cellulose triacetate, cellulose diacetate, cellulose acetate butyrate, polyamides, polyimides, polyethersulfone, polysulfone, polypropylene, polymethylpentene, polyvinyl chloride, polyvinyl acetal, polyetherketones, polymethyl methacrylate, polycarbonate or polyurethane, and thermoplastic resins such as cyclopolyolefins. Particularly, polyester (polyethylene terephthalate, polyethylene naphthalate) and cellulose triacetate are preferred.

The light-transmitting substrate is preferably used in a film-like shape which is rich in flexibility. Further, a plate of the above-described thermoplastic resins or a plate-like body such as a glass plate may be used as the Substrate in the case where curability is needed in the use of the substrate.

The thickness of the light-transmitting substrate is preferably 20 to 300 μm, and more preferably is the upper limit of 200 μm and the lower limit of 30 μm. When the light-transmitting substrate is in a plate-like shape, the thickness may be outside the aforementioned range.

When an anti-glare layer is formed on the light-transmitting substrate, in order to improve the adhesive property, the light-transmitting substrate may be previously subjected to physical treatment such as corona discharge treatment, plasma treatment, saponification treatment, and oxidation treatment, or may be previously coated with an anchor agent or a paint composition called a primer.

In the anti-glare film of the present invention, the diffusion layer is obtainable by applying, on the at least one surface of the light-transmitting substrate, a coating composition including organic fine particles (A) and a radiation curable binder that includes a (meth)acrylate monomer as an essential component, preferably further including fine particles (B), and more preferably further including a solvent that swells the organic fine particles (A); drying the coating composition to form a coating; and curing the coating.

Unless otherwise noted, the diffusion layer includes the organic fine particles (A) and the fine particles (B). Unless otherwise stated, the diffusion layer indicates a cured coating layer.

The organic fine particles (A) in the diffusion layer each have an impregnation layer that is impregnated with the radiation curable binder. Hereinafter, organic particles (A) free from the impregnation layer are referred to as "organic fine particles (A1)", and organic fine particles (A) with the impregnation layer, that is, organic fine particles (A) in a diffusion layer are referred to as "organic fine particles (A2)".

The organic fine particles (A2) having such an impregnation layer are highly adhered to a cured product (hereinafter, also referred to as a binder resin) of the radiation curable binder in the diffusion layer. The radiation curable binder and a material constituting the organic fine particles (A2) are mixed in the impregnation layer of the organic fine particles (A2). Therefore, the refractive index of the impregnation layer is intermediate between those of the radiation curable binder and the organic fine particles (A). Therefore, reflection of light passing through the diffusion layer can be preferably reduced at the interface between the organic fine particles (A2) (impregnation layer) and the binder resin. In addition, the impregnation layer has an appropriate thickness and the center portion of each of the organic fine particles (A2) retains the same refractive index as that of the original organic fine particles (A). Therefore, scintillation can be preferably prevented without reducing the internal diffusion.

In the conventional anti-glare films, anti-glare performance and a scintillation state may be changed over time due to the haze variation in response to temperature and moisture changes. However, the anti-glare film of the present invention employing such an impregnation layer is remarkably stable (has excellent moisture and heat resistance) without being affected by such problems. This is assumed to result from the following mechanism.

The moisture and heat resistance test of the conventional anti-glare film containing organic fine particles shows that moisture entered into the diffusion layer acts on the distortion of the interface between the organic fine particles and the binder resin. As a result, an increase in the distortion, generation of a micro crack, and the like are caused. Thereby, an anti-glare property is assumed to vary over time (haze variation). The distortion is remarkably observed in organic fine particles with a large particle size.

However, the distortion of the interface between the present organic fine particles (A2) with the impregnation layer and the binder resin is reduced. Therefore, the increase in the distortion, the generation of a micro crack, and the like are assumed to be suppressed. Further, as described below, since in the presence of the radiation curable binder and the solvent, the impregnation layer is preferably obtainable by swelling the organic fine particles (A1) with the radiation curable binder and/or the solvent, the organic fine, particles (A2) are extremely rich in flexibility. Therefore, projections formed at positions corresponding to the organic fine particles (A2) in the surface of the diffusion layer are gently curved. This is explained in detail below.

The material, constituting the organic fine particles (A1) is preferably a material that can be swollen with the following radiation curable binder and/or the following solvent. Specific examples of the material include a silicone resin, a polyester resin, a styrene resin, an acrylic resin, an olefin resin, and copolymers thereof. Among these, an acrylic resin is preferably used. Particularly, a cross-linked acrylic resin in which a cross-linking degree is changed, for example, by improving cross-link density when the resin is formed into particles is more preferably used. The term "resin" used herein includes resin components such as a reactive or nonreactive polymer, a reactive or nonreactive monomer, and a reactive or nonreactive oligomer.

Organic fine particles formed of an acrylic resin, a styrene resin, or an acrylic-styrene copolymer may be produced using an acrylic-styrene copolymer resin as a material when produced by a generally known method. If the organic fine particles (A1) are core-shell fine particles, styrene fine particles using acrylic resin fine particles as a core and acrylic fine particles using styrene resin fine particles as a core. Therefore, in the present description, acrylic fine particles, styrene fine particles, and acrylic-styrene copolymer fine particles are determined by characteristics (for example, refractive index) of resins forming the particles. For example, fine particles with a refractive index of less than 1.50 are acrylic fine particles, fine particles with a refractive index of 1.50 or more and less than 1.59 are acrylic-styrene copolymer fine particles, and fine particles with a refractive index of 1.59 or more are styrene fine particles.

As the cross-linked acrylic resin, for example, homopolymers and copolymers obtainable by polymerization (e.g., suspension polymerization) of an acrylic monomer such as acrylic acid, acrylic ester, methacrylic acid, methacrylic ester, acrylamide, and acrylonitrile using a polymerization initiator such as persulfuric acid and a crosslinking agent such as ethylene glycol dimethacrylate.

As the acrylic monomer, a cross-linked acrylic resin obtainable using methyl methacrylate is particularly preferred. The thickness of the impregnation layer is controllable by adjusting the degree of swelling by the radiation curable binder and/or the solvent described below. In order to do this, the cross-linking degree is previously changed so that the amount of the radiation curable binder used for impregnation is in the preferred range.

The average particle size of the organic fine particles (A1) is preferably 0.5 to 15.0 μm, and more preferably 1.0 to 10.0 μm. If the average particle size is less than 0.5 μm, the anti-glare property and the prevention of scintillation of the anti-glare film of the present invention may be insufficient. If the average particle size exceeds 15.0 μm, an image of a display using the anti-glare film of the present invention is vaguely-outlined, lacks in precision, and is grainy. Thereby, the display quality may deteriorate.

The average particle size means the average particle size of fine particles mono-dispersed in the diffusion layer (particles with a uniform shape); or the size of particles existing the most in the diffusion layer in the case that the particles are irregular particles with broad particle size distribution. The particles existing the most are determined by particle size distribution measurement. If the diffusion layer includes only particles, the particle size thereof may be determined by the Coulter counter method or the like. In addition to the method, fine particles in a cured layer may be determined by SEM cross-sectional observation or microscopic observation using transmitted light.

The organic fine particles (A2) in the diffusion layer each have an impregnation layer.

The impregnation layer is a layer impregnated with the radiation curable binder. The radiation curable binder penetrates into the organic fine particles (A2) in the diffusion layer from the outer surface toward the center. The impregnation layer is impregnated with a low molecular component of the radiation curable binder, namely impregnated mainly with a monomer. A polymerized radiation curable binder, which is a polymer component, in the form of a polymer or an oligomer, is hard to penetrate into the organic fine particles (A2).

The impregnation layer may be observed, for example, by cross sectional microscope (e.g., SEM) observation of the organic fine particles (A2) in the diffusion layer.

All components constituting the radiation curable binder may penetrate into the impregnation layer or part of the components may penetrate into the impregnation layer.

In the anti-glare film of the present invention, if the diffusion layer includes the fine, particles (B) described below, the organic fine particles (A2) preferably have an average particle size larger than that of the fine particles (B) in the diffusion layer. If the average particle size of the organic fine particles (A2) is equal to or smaller than that of the fine particles (B) in the diffusion layer, projections at positions corresponding to the organic fine particles (B) in the surface of the diffusion layer may be distinctly formed, whereby white muddiness may not be sufficiently suppressed.

The impregnation layer has an average thickness of 0.01 to 1.0 μm. If the thickness is less than 0.01 μm, the effect of the formation of the impregnation layer cannot be sufficiently obtained. If the thickness exceeds 1.0 μm, an internal diffusion function of the organic fine particles (A2) is not sufficiently exerted, whereby the effect of the prevention of scintillation cannot be sufficiently obtained. The lower limit of the average thickness of the impregnation layer is preferably 0.1 μm, and the upper limit of the average thickness of the impregnation layer is preferably 0.8 μm. The impregnation layer with the thickness in the above range further enhances the effect. The size of the center portion free from the impregnation layer is preferably a wavelength of light or more in view of securing the internal, diffusion function and the prevention of scintillation.

The average thickness of the impregnation layer means the average thickness of the impregnation layer of the organic fine particles (A) when the layer is viewed in cross section. The particles (A) are observed in cross-sectional SEM images of the anti-glare film. Specifically, the average thickness of the impregnation layer can be determined by the following ways. The cross section of the diffusion layer is observed at 3000× to 50000× magnification in five SEM images, in each of which at least one fine particle with an impregnation layer exists, and the images are taken; the thickness of the impregnation layer is measured at two points for each fine particle; and the average of the resulting 10 measurement values was adopted for the average thickness of the impregnation layer. The two points selected for the measurement of the thickness of the impregnation layer are such that the interface between fine particles and a binder resin around the fine particles is relatively clearly observed and the amount of the resin binder penetrating into the impregnation layer is the largest.

The organic fine particles generally have a cross-linked structure. The degree of swelling by the radiation curable binder and/or the solvent depends on the cross-linking degree. Generally, the degree of swelling becomes low with increase in the cross-linking degree, and the degree of swelling becomes high with decrease in the cross-linking degree. Therefore, if the material constituting the organic fine particles (A2) is the above-described cross-linked acrylic resin, the thickness of the impregnation layer may be controlled in a desired range by adjusting the cross-linking degree of the cross-linked acrylic resin. It is more preferable that, in the organic fine particles (A2), the nearer the center portion, the higher the cross-linking degree, in view of antireflection and prevention of scintillation. It is most preferable that a portion under the impregnation layer of the organic fine particle (A2) has such a cross-linking degree that no impregnating ability is provided, and the nearer the surface, the lower the cross-linking degree.

In the anti-glare film of the present invention, $D_A1$ and $D_A2$ preferably satisfy the formula (2):

$$0.01 \text{ μm} < D_A2 - D_A1 < 1.0 \text{ μm} \quad (2)$$

wherein $D_A1$ represents an average particle size of the organic fine particles (A1) and $D_A2$ represents an average particle size of the organic fine particles (A2) in the diffusion layer.

In the formula (2), if "$D_A2-D_A1$" is 0.01 μm or less, the thickness of the impregnation layer is too small, whereby no effect of the formation of the impregnation layer may be obtained. If "$D_A2-D_A1$" is 1.0 μm or more, an internal diffusion function is not sufficiently exerted, whereby an effect of the prevention of scintillation may not be enhanced.

The lower limit of "$D_A2-D_A1$" is more preferably 0.1 μm, and the upper limit of "$D_A2-D_A1$" is more preferably 0.5 μm. If "$D_A2-D_A1$" is within the above range, the effect described above may be achieved.

In the anti-glare film of the present invention, anti-glare films are prepared using coating compositions including organic fine particles with different cross-linking degrees, and organic fine particles achieving a suitable impregnation degree are selected from these as the organic fine particles (A1).

The organic fine particles (A2) in the diffusion layer preferably do not aggregate in the thickness direction (longitudinal direction) of the diffusion layer. If the organic fine particles (A2) in the diffusion layer aggregate to be piled up in the thickness direction of the diffusion layer, large projections may be formed in the surface of the diffusion layer at positions corresponding to the aggregation of the organic fine particles (A2), whereby white muddiness and scintillation may be caused in the anti-glare film of the present invention. The aggregation of the organic fine particles (A2) in the diffusion layer may be suitably prevented, for example, by adding a lamellar inorganic compound in the diffusion layer. The above problems are less likely to be caused by the organic fine particles (A2) aggregated in the perpendicular direction (transverse direction) against the thickness direction of the diffusion layer, compared to the aggregation formed only in the longitudinal direction. However, too large aggregation causes similar problems. Therefore, the lamellar inorganic compound is preferably added like in the case where the particles are aggregated in the longitudinal direction.

The amount of the organic fine particles (A1) in the coating composition is preferably, but is not particularly limited to, 0.5 to 30 parts by mass based on 100 parts by mass of the radiation curable binder described below. If the amount is less than 0.5 parts by mass, a sufficient surface roughness of the diffusion layer cannot be formed, which may results in an insufficient anti-glare property of the anti-glare film of the present invention. If the amount exceeds 30 parts by mass, the organic fine particles (A1) are likely to aggregate in the coating composition, and are likely to aggregate in the longitudinal direction or the transverse direction in the diffusion layer. Thereby, large projections are formed in the surface of the diffusion layer, which may cause white muddiness and scintillation. The lower limit of the amount of the organic fine particles (A1) is more preferably 1.0 part by mass, and the upper limit of the amount is more preferably 20 parts by mass. If the amount is within the above range, the effects described above may be certainly achieved.

The fine particles (B) are particles not swollen with the radiation curable binder and the solvent in the coating composition.

Here, the "particles not swollen" includes particles slightly swollen with the radiation curable binder and the solvent in addition to particles not swollen with the binder and the solvent at all. The fine particles (B) in the diffusion layer include an impregnation layer that is similar to that of the organic fine particles (A2). The "particles slightly swollen" are the fine particles (B) in which the average thickness of the impregnation layer is smaller than that of the impregnation layer of the organic fine particles (A) and is less than 0.1 μm. The fine particles (B) preferably have a slight impregnation layer in view of the suppression of a variation of anti-glare performance over time.

The formation of the impregnation layer of the fine particles (B) in the diffusion layer is confirmed, for example, by observation of the cross section of the particles under a microscope (e.g., SEM).

In the following description, the fine particles (B) before being added to the coating composition are referred to as "fine particles (B1)" and the fine particles (B) in the diffusion layer are referred to as "fine particles (B2)".

The fine particles (B1) are not particularly limited as long as the particles are not, swollen with the radiation curable binder and the solvent. Examples of these include inorganic particles such as silica fine particles; and organic particles, having a high cross-linking degree, of a silicone resin, a polystyrene resin, a melamine resin, a polyester resin, an acrylic resin, an olefin resin, and copolymers of these resin. Particularly, organic particles with an easy-controlled refractive index or an easy-controlled particle size are preferred. The fine particles (B1) may be used alone, or two or more types thereof may be used in combination.

Particularly, polystyrene fine particles and/or acrylic-styrene copolymer fine particles are preferably used because the refractive index thereof is high and the difference between such a high refractive index and the refractive index of the binder (a refractive index of the radiation curable binder is generally about 1.48 to about 1.54) is likely to increase and the internal diffusion of the particles are easily achieved. The fine particles (B) are described as organic particles below.

In the following description, the term "high cross-linked" or "low cross-linked" is used for modifying the term fine particles. The definitions of the terms "high cross-linked" and "low cross-linked" are described below. 190 parts by mass of a mixture of toluene and methyl isobutyl ketone (mass ratio, 8:2) is blended with 100 parts by mass of a mixture of a radiation curable binder (pentaerythritoltriacrylate (PETA)), dipentaerythritclhexaacrylate (DPHA), and polymethyl methacrylate (PMMA) (mass ratio; PETA/DPHA/PMMA=86/5/9) to prepare a coating composition.

Fine particles are immersed in the resulting coating composition for 24 hours. Swollen fine particles are defined as "low cross-linked" fine particles, and non swollen fine particles are defined as "high cross-linked" fine particles.

The average particle size of the fine particles (B1) is not particularly limited, and may be similar to that of the organic fine particles (A1). However, in the presence of the radiation curable binder and/or the solvent, the organic fine particles (A1) are swollen with the radiation curable binder and/or the solvent, whereby an impregnation layer is formed. Therefore, in the anti-glare film of the present invention, $D_A1, D_B1, D_A2$, and $D_B2$ preferably satisfy the formula (3):

$$1.0 \text{ μm} > D_A2 - D_A1 > D_B2 - D_B1 \geq 0 \quad (3)$$

wherein $D_A1$ represents an average particle size of the organic fine particles (A1), $D_B1$ represents an average particle size of the fine particles (B1), $D_A2$ represents an average particle size of the organic fine particles (A2) in the diffusion layer, and $D_B2$ represents an average particle size of the fine particles (B2) in the diffusion layer.

When the formula (3) is satisfied, a surface roughness of the diffusion layer becomes smooth, and the variation of a refractive index of particles contributing to the internal diffusion caused by the impregnation of the particles with the binder or the like is suppressed, whereby the internal diffusion is easily maintained. Further, the reflection at surfaces of the particles in the diffusion layer is reduced. Therefore, white muddiness and scintillation of the anti-glare film of the present invention can be certainly prevented.

In the anti-glare film of the present invention, anti-glare films are prepared using coating compositions including organic fine particles with different cross-linking degrees, and organic fine particles achieving a suitable impregnation degree are selected from these as the organic fine particles (B1).

The amount of the organic fine particles (B1) in the coating composition is preferably, but is not particularly limited to, 0.5 to 30 parts by mass based on 100 parts by mass of the radiation curable binder described below. If the amount is less than 0.5 parts by mass, scintillation is likely to be generated. If the amount exceeds 30 parts by mass, contrast may be reduced. The lower limit of the amount of the organic fine particles (B1) is more preferably 1.0 part by mass, and the upper limit of the amount is more preferably 20 parts by mass. If the amount is within the above range, the effect described above may certainly be achieved.

In the anti-glare film of the present invention, the radiation curable binder includes a (meth)acrylate monomer as an essential ingredient.

The radiation curable binder preferably swells the organic fine particles (A1) described above and is preferably transparent. Examples of the radiation curable binder include an ionizing radiation curing resin which is curable with ultraviolet radiation or electron rays. The term "(meth)acrylate" used herein refers to methacrylate and acrylate.

Since the monomer in the present description is curable with ionizing radiation to become a polymer film, the monomer may be any of molecules that are to be a structural unit of a basic structure of the polymer film, and may include at least one unsaturated bond. That is, if the cured film includes oligomers or prepolymers as a basic unit, the monomer may include oligomers and prepolymers.

In the present invention, the monomer preferably has a molecular weight of 5000 or less.

Examples of the (math) acrylate monomer include compounds having one or two or more unsaturated bonds, such as a compound having a (math) acrylate functional group.

Examples of the compound having one unsaturated bond include ethyl(meth)acrylate, ethylhexyl(meth)acrylate, styrene, methylstyrene, and N-vinyl pyrrolidone. Examples of the compound having two or more unsaturated bonds include reaction products (for example, poly(meth)acrylate esters of polyhydric alcohols) of (meth)acrylate with multifunctional compounds such as polymethylolpropane tri(meth)acrylate, hexanediol di(meth)acrylate, polypropylene glycol di(meth) acrylate, diethylene glycol di(meth)acrylate, polyethylene glycol di(meth)acrylate, bisphenol F EO-modified di(meth) acrylate, bisphenol A EO-modified di(meth)acrylate, trimethylolpropane tri(meth)acrylate, dipentaerythritol penta(meth)acrylate, EO-modified isocyanurate di(meth)acrylate, EO-modified isocyanurate tri(meth)acrylate, PO-modified trimethylolpropane tri(meth)acrylate, EO-modified trimethylolpropane tri(meth)acrylate, ditrimethylolpropane tetra (meth)acrylate, pentaerythritol tri(meth)acrylate, pentaerythritol penta(meth)acrylate, dipentaerythritol hexa(meth) acrylate, 1,6-hexanediol di(meth)acrylate, and neopentylglycol di(meth)acrylate.

Examples of the compound having two or more unsaturated bonds further include urethane(meth)acrylate and polyester(meth)acrylate each including two or more unsaturated bonds.

Examples of the ionizing-radiation curable resin include, in addition to the (math) acrylate monomer, resins having an unsaturated double bond and a comparatively low molecular weight, such as a polyester resin, a polyether resin, an acrylic resin, an epoxy resin, a urethane resin, an alkyd resin, a spiroacetal resin, a polybutadiene resin, and a polythiol polyene resin.

If the ionizing radiation-curable resin is used as an ultraviolet-curable resin, the coating composition preferably includes a photopolymerization initiator.

Specific examples of the photopolymerization initiator include acetophenones, benzophenones, Michler-benzoyi benzoate, α-amyloxime esters, thioxanthones, propiophenones, benzyls, benzoins, and acyl phosphine oxides. Also, the composition preferably further includes a photosensitizer, and specific examples thereof include butylamine, triethylamine, and poly-n-butyl phosphine.

In the case that the ultraviolet-curable resin is a resin having a radically polymerizable unsaturated group, one of acetophenones, benzophenones, thioxanthones, benzoin, and benzoin methyl ether, or any combination of these is preferably used as the photopolymerization initiator. In the case that the ultraviolet-curable resin is a resin having a cat ionically polymerizable functional group, one of aromatic diazonium salts, aromatic sulfonium salts, aromatic iodonium salts, metallocene compounds, and benzoin sulfonic esters, or any combination of these may be used as the photopolymerization initiator.

The amount of the photopolymerization initiator is preferably 0.1 to 10 parts by mass based on 100 parts by mass of the ultraviolet-curable resin.

The ionizing radiation-curable resin may be used together with a solvent-drying resin (a resin such as a thermoplastic resin that becomes a coating film only by drying, in the coating process, the solvent added for adjusting the solid content). In this case, the solvent-drying resin serves as an additive, and an ionizing radiation-curable resin is mainly used as it. The amount of the solvent-drying resin is preferably 40% by mass or less based on the total solid contents of the resin component included in the coating composition.

A major example of the solvent-drying resin may be a thermoplastic resin. As the thermoplastic resin, common thermoplastic resins are used. Addition of the solvent drying resin enables to effectively prevent generation of a coating-film defect on a coated surface.

Specific examples of preferable thermoplastic resins include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, rubbers, and elastomers.

The thermoplastic resin is usually preferably amorphous and soluble in an organic solvent (particularly a common solvent that can dissolve polymers and curable compounds). Particularly, the resin preferably has a high forming property or a high film forming property, high transparency and high weather resistance. Examples of the resin include styrene resins, (meth)acrylic resins, alicyclic olefin resins, polyester resins, and cellulose derivatives (cellulose esters and the like).

In a preferable aspect of the present invention, if a material of the light-transmitting substrate is a cellulose resin such as triacetyl cellulose "TAC", preferable specific examples of the thermoplastic resin include cellulose resins such as nitrocellulose, acetyl cellulose, cellulose acetate propionate, and ethyl hydroxyethyl cellulose. Use of the cellulose resin can improve the transparency and the adhesion between the light-transmitting substrate and the diffusion layer.

The coating composition may further contain a thermosetting resin. Examples of the thermosetting resin include, phenol resins, urea resins, diallyl phthalate resins, melamine resins, guanamine resins, unsaturated polyester resins, polyurethane resins, epoxy resins, amino alkyd resins, melamine-area co-condensation resins, silicon resins, and polysiloxane resins. A curing agent such as a crosslinking agent and a polymerization initiator, a polymerization accelerator, a solvent, a viscosity adjustment agent, or the like is used together with the thermosetting resin if necessary.

In the anti-glare film of the present invention, $\Delta_A$ and $\Delta_B$ preferably satisfy the formula (1):

$$|\Delta_A| < |\Delta_B| \qquad (1)$$

wherein $\Delta_A$ represents a difference between a refractive index of the radiation curable binder and a refractive index of the organic fine particles (A1) and $\Delta_B$ represents a difference between a refractive index of the radiation curable binder and a refractive index of the organic fine particles (B1).

When the formula (1) is satisfied, the anti-glare film can be obtained in which scintillation because of internal diffusion of the organic fine particles (A) with a small diffusion angle and internal diffusion of the organic fine particles (B) with a large diffusion angle is not observed and screen intensity is uniform.

The refractive indexes of the radiation curable binder, the organic fine particles (A1), and the organic fine particles (B1) may be measured by any method such as the Becke method, the minimum deviation angle method, the deflection angle analysis, the mode-line method, and the ellipsometry method. Such methods may be used for measuring fine particles removed from an anti-glare film product in some way, as well as the material itself.

If the radiation curable binder includes resins and additives in addition to the (meth)acrylate, the refractive index of the radiation curable binder is determined as the refractive index derived from all resin and of additive components other than the fine particles.

The refractive index of the radiation curable binder is preferably measured by the Becke method using only a binder portion cut from a cured film. The difference between the refractive index of the organic fine particles and the refractive index of the resin component may be determined by measuring the phase difference using a transmission phase-shifting laser microscope interferometer PLM-OPT manufactured by NTT Advanced Technology Corp. Therefore, the refractive index of the organic fine particles may be determined as the refractive index of the resin component±the refractive-index difference.

Examples of the solvent include, but are not particularly limited to, alcohols (for example, methanol, ethanol, isopropanol, butanol, and benzyl alcohol); ketones (for example, acetone, methyl ethyl ketone, methyl isobutyl ketone, cyclohexanone, and cyclopentanone); esters (for example, methyl acetate, ethyl acetate, propyl acetate, butyl acetate, methyl formate, ethyl formate, propyl formate, and butyl formate); aliphatic hydrocarbons (for example, hexane and cyclohexane); halogenated hydrocarbons (for example, methylene chloride, chloroform, and carbon tetrachloride); aromatic hydrocarbons (for example, benzene, toluene, and xylene); amides (for example, dimethylformamide, dimethylacetamide, and n-methyl pyrolidone); ethers (for example, diethyl ether, dioxane, and tetrahydrofuran); and ether alcohols (for example, 1-methoxy-2-propanol).

Both the radiation curable binder and the solvent may be ones capable of swelling the organic fine particles (A1) or one of them may be one capable of swelling the organic fine particles (A1).

The impregnation layer of the organic fine particles (A1) can be certainly formed in the presence of the solvent capable of swelling the organic fine particles (A1) without being dependent on the degree of swelling by the radiation curable binder. Therefore, at least the solvent is preferably one capable of swelling the organic fine particles (A1). It is considered that this is because the solvent firstly acts on the organic fine particles (A1) and swells the particles (A1), and then low molecular weight components included in the radiation curable binder penetrate into the particles.

In the anti-glare film of the present invention, the combination of a (meth)acrylate monomer as the radiation curable binder and ketones or esters as the solvent is preferably used as the combination of the radiation curable binder and the solvent. This is because a (meth)acrylate monomer with a small molecular weight easily penetrates into the particles (A1) and ketones and esters well swell the organic fine particles (A1).

The swelling degree of the organic fine particles (A1) is adjusted by mixing the solvent, whereby the penetration amount of the low molecular weight component of the radiation curable binder can be controlled.

When cellulose triacetate (hereinafter, also referred to as a TAC substrate) is used as the light-transmitting substrate, a solvent capable of swelling the TAC substrate to prevent adhesion at the interface between the light transmitting substrate and the diffusion layer or prevent generation of interference fringe at the interface; or a solvent capable of allowing the solvent and the low molecular weight component in the resin components penetrate into the TAC substrate is preferably used. A common solvent is preferably used for the solvent swelling the organic fine particles (A) and the solvent penetrating into the TAC substrate. That is, if the solvent penetrating into the TAC substrate is similar to the solvent used for preparing an impregnation layer in the organic fine particles (A), compounds included in the coating composition are remarkably well balanced and the coating composition can be excellently stably processed into the anti-glare film even if the process takes a long time.

Methyl isobutyl ketone and the like are preferred as such a solvent. Preferred examples of the low molecular weight component in the resin component include pentaerythritol tri(meth)acrylate, pentaerythritol penta(meth)acrylate, dipentaerythritol penta(meth)acrylate, and dipentaerythritol hexa(meth)acrylate.

The coating composition preferably further includes a lamellar inorganic compound. The diffusion layer including the lamellar inorganic compound can improve shock resistance such as prevention of curl, ultraviolet light resistance, and crack resistance.

Examples of the lamellar inorganic compound include, but are not particularly limited to, montmorillonite, beidellite, nontronite, saponite, hectorite, sauconite, stevensite, vermiculite, halloysite, kaolinite, endellite, dickite, talc, pyrophyllite, mica, margarita, muscovite, phlogopite, tetrasilylic mica, taeniolite, antigorite, chlorite, cookeite, and nimite. These lamellar inorganic compounds may be natural products or synthesized products.

Among the lamellar inorganic compounds, an inorganic compound including an element. Si, Al, Mg, or O is preferred. Talc is preferred as the compound including such an element. For example, when talc is used as the lamellar inorganic compound, cross-linked acrylic beads are used as the organic fine particles (A1), and styrene is used as the organic fine particles (B1), the aggregation degrees of the organic fine particles (A2) and the organic fine particles (B2) in the diffusion layer can be preferably controlled. This achieves an anti-glare property, prevention of white muddiness, and prevention of scintillation of the anti-glare film, at a high level.

It is considered that this is because the talc is highly lipophilic. That is, it is considered that the talc with high lipophilicity controls the aggregation of the organic fine particles (A1) (cross-linked acrylic resin) with a hydrophilic property and the organic fine particles (B1) (styrene) with a lipophilic property.

The lamellar inorganic compound refers to an inorganic compound with a lamellar structure, and includes an inorganic compound with a needlelike appearance or a fibrous appearance when the cross section is observed under a microscope.

The amount of the lamellar inorganic compound in the coating composition is preferably 0.5 to 40 parts by mass based on 100 parts by mass of the radiation curable binder. If the amount is less than 0.5 parts by mass, the shock resistance of the anti-glare film of the present invention and/or the dispensability of the organic fine particles (A2) and the like of the anti-glare film of the present invention may become insufficient. If the amount exceeds 40 parts by mass, the coating composition forming the diffusion layer may be toe viscous to be coated or the surface roughness of the resulting coating may not be controlled. The lower limit of the amount of the lamellar inorganic compound is more preferably two parts by mass, and the upper limit of the amount is more preferably 20 parts by mass. If the amount is within the above range, the effects of the shock resistance and/or the dispersibility of the fine particles may be further exerted and the surface roughness is easily controlled.

The coating composition may be prepared by mixing the materials described above.

The method of preparing the coating composition by mixing the materials is not particularly limited. For example, a paint shaker or a bead mill may be used.

The diffusion layer may be formed by applying the coating composition on at least one surface of the light-transmitting substrate, drying the coating composition to form a coating, and curing the coating.

The method of applying the coating composition is not particularly limited, and examples thereof include roll coating, Meyer bar coating, gravure coating, and die coating.

The thickness of the coating resulting from the coating composition is not particularly limited, and determined depending on, for example, the shape of the surface roughness of the coating and the materials to be used. If the thickness is 1 µm or more, the coating is excellent in a hard coat property. If the thickness is 20 µm or less, curl is less likely to be generated. Therefore, the thickness is preferably about 1 µm to about 20 µm, more preferably 2 to 15 µm, and still more preferably 2 µm to 10 µm.

The thickness of the diffusion layer may be determined by the cross-sectional SEM observation. Such a thickness is determined by the following way. The distance between the surface of the diffusion layer including no organic fine particles (A2) and the interface of the light transmitting substrate is measured at 5 or more different points. The average of the resulting values is calculated as the thickness of the diffusion layer.

As described above, the organic fine particles (A2) are prepared by swelling the organic fine particles (A1) with the radiation curable binder and/or the solvent and forming an impregnation layer impregnation with the radiation curable binder. The organic fine particles (A2) may be prepared in the coating composition or in the coating formed on the light-transmitting substrate.

The prepared coating composition is preferably allowed to stand for a certain period of time before the diffusion layer is formed.

If the diffusion layer is formed without allowing the coating composition to stand, a sufficient impregnation layer may not be formed in the organic fine particles (A2) in the diffusion layer even if the cross-linking degree of the organic fine particles (A) to be used and the swelling degree of the organic fine particles (A) swollen with the radiation curable binder and/or the solvent are suitably adjusted.

The coating composition may be allowed to stand for a certain period of time that depends on the type, cross-linking degree, and particle size of the organic fine particles (A) to be used, and the type of the radiation curable binder and/or the solvent to be used. For example, the coating composition is preferably allowed to stand for about 12 hours to about 48 hours.

The coating formed on the light-transmitting substrate may be dried if necessary, and cured to form the diffusion layer.

The method of curing the coating is not particularly limited, and the coating is preferably cured by UV irradiation. The ultraviolet rays in a wavelength band from 190 to 380 nm are preferably used for the curing. The curing by the ultraviolet rays may be performed using, for example, a metal halide lamp, a high-pressure mercury lamp, a low-pressure mercury lamp, an ultra-high-pressure mercury lamp, a carbon arc, or a black light fluorescent lamp. Specific examples of a source of such electron rays include electron beam accelerators of Cockcroft-Walton type, van de Graaff type, resonance transformer type, insulating core transformer type, linear type, dynamitron type, and high frequency type.

In the anti-glare film of the present invention, the diffusion layer has a surface roughness.

The diffusion layer preferably includes projections (hereinafter, also referred to as projections (A)) at positions corresponding to the organic fine particles (A) in the diffusion layer. The height of the projections (A) is preferably lower than that of projections (hereinafter, also referred to as projections (C)) at positions corresponding to organic fine particles (C) in the surface of a diffusion layer (C) that satisfies all the following requirements (1), (2), and (3):

Requirement (1): the diffusion layer (C) is formed in the same conditions as the diffusion layer containing the organic fine particles (A), except that the organic fine particles (C) are used instead of the organic fine particles (A);

Requirement (2): the average particle size of the organic fine particles (C) in the diffusion layer (C) is the same as that of the organic fine particles (A) in the diffusion layer; and Requirement (3): no impregnation layer is formed in each of the organic fine particles (C) in the diffusion layer (C).

The projections (A) have a height lower than that of the projections (C), and are gently curved. The anti-glare film of the present invention including a diffusion layer with such projections is excellent in an anti-glare property, prevention of white muddiness, and prevention of scintillation.

It is considered that this is because the organic fine particles (A) in the coating to be cured are the organic fine particles (A2) each including the impregnation layer, and the organic fine particles (A2) are very much more flexible than the organic fine particles (C). That is, although the radiation curable binder shrinks when the coating is cured, cure shrinkage of the surface where the organic fine particles (A2) are placed is more reduced than that of the surface where no organic fine particles (A) are placed because of the small amount of the radiation curable binder. However, since the organic fine particles (A2) are excellent in flexibility, the organic fine particles (A) deform due to the cure shrinkage of the coating. As a result, the height of the formed projections (A) may be lower than that of the projections (C) formed in the surface of the diffusion layer (C) that includes inflexible organic fine particles (C). Therefore, the projections (A) become smooth.

The height of the projections refers to a height n (n is 1 to 10) which is a distance from the top of a projection to the bottom of a depression between two adjacent projections in the surface, and is measured by observing the surface of the anti-glare film with AFM. The height n is measured at 10 points, and the average value was adopted for the height of the projections.

Since the anti-glare film of the present invention has the diffusion layer described above, the adhesion between the organic fine particles (A) in the diffusion layer and the cured product of the radiation curable binder is extremely excellent. The anti-glare film of the present invention is subjected to a mandrel test. The results are that the film is not cracked preferably when a mandrel of 10 mm diameter is used, more preferably when a mandrel of 8 mm diameter is used, and still more preferably when a mandrel of 6 mm diameter is used.

Since the impregnation layer is formed in each of the organic fine particles (A) in the diffusion layer and the radiation curable binder is mixed in the impregnation layer, the difference between the refractive index of the organic fine particles (A) (impregnation layer) in the diffusion layer and the refractive index of the cured product of the radiation curable binder is reduced. Therefore, reflection at the interface can be preferably reduced. In addition, the impregnation layer has an appropriate thickness and the center portion of each of the organic fine particles (A) retains the same refractive index as that of the original organic fine particles (A).

Therefore, appropriate internal diffusion can be exerted and scintillation can be preferably prevented.

Further, the projections formed at positions corresponding to the organic fine particles (A) in the diffusion layer are small in height and gently curved.

This achieves an anti-glare property, prevention of white muddiness, and prevention of scintillation, of the anti-glare film, at a high level.

The anti-glare film of the present invention preferably has a haze variation during a 60° C., 90% RH, 1000-hour moisture and heat resistance test of 1.5% or less. If the haze variation exceeds 1.5%, the anti-glare film may have low moisture and heat resistance and the anti-glare performance may change over time in response to temperature and moisture changes. The haze variation is preferably 1.0% or less. Such moisture and heat resistance can be achieved in the anti-glare film having the diffusion layer including the organic fine particles (A) with the impregnation layer.

Here, the haze is determined using a haze meter HM150 (product name, manufactured by Murakami Color Research Laboratory Co., Ltd.) according to the haze defined by JIS K 7136. The haze values in the present invention are all measured by the method.

A method for producing such an anti-glare film of the present invention is also one aspect of the present invention.

That is, a method for producing an anti-glare film of the present invention includes a light-transmitting substrate and a diffusion layer having a surface roughness and provided on at least one surface of the light transmitting substrate. The method comprises forming the diffusion layer by applying, on the at least one surface of the light-transmitting substrate, a coating composition including organic fine particles (A), a radiation curable binder that includes a (meth)acrylate monomer as an essential component, and a solvent; drying the coating composition to form a coating; and curing the coating, the radiation curable binder and/or the solvent including a component that swells the organic fine particles (A), the organic fine particles (A) each having an impregnation layer that is impregnated with the radiation curable binder and has an average thickness of 0.01 to 1.0 µm.

In the method for producing the anti-glare film of the present invention, a material and the like constituting the coating composition are the same as those of the above-described anti-glare film of the present invention.

Further, the process for forming the diffusion layer is the same as that for forming the above-described anti-glare film of the present invention is used.

A polarizer provided with a polarizing element, comprising the anti-glare film of the present invention is also one aspect of the present invention. A light-transmitting substrate is attached to the surface of the polarizing element.

Examples of the polarizing element include, but are not particularly limited to, films dyed with iodine or the like and stretched, such as a polyvinyl alcohol film, a polyvinyl formal film, a polyvinyl acetal film, and an ethylene-vinyl acetate copolymer saponified film. In the lamination of the polarizing element and the anti-glare film of the present invention, the light-transmitting substrate is preferably subjected to saponification treatment. The saponification treatment makes the adhesion good, and an antistatic effect can also be achieved.

The present invention also relates to an image display device including the anti-glare film or the polarizer on the outermost surface. Examples of the image display device include LCDs, PDPs, FEDs, ELDs (organic EL, inorganic EL), CRTs, touch panels, and electronic paper.

The LCDs include a light-transmitting display and a light source apparatus for irradiating the light-transmitting display from the backside. When the image display device of the present invention is LCDs, the anti-glare film of the present invention or the polarizer of the present invention is formed on the surface of the light-transmitting display.

When the present invention directs to a liquid crystal display device having the anti-glare film, a light source of the light source apparatus emits light to the anti-glare film from the underside. Here, in an STN liquid crystal display device, a retardation plate may be disposed between a liquid crystal display element and a polarizer. An adhesive layer may be provided between layers of the liquid crystal display device as required.

The PDPs include a surface glass substrate and a back glass substrate facing to the surface glass substrate. Discharge gas is enclosed between the substrates. When the image display device of the present invention is PDP, the image display device includes the anti-glare film described above on the surface of the surface glass substrate or a front plate (glass substrate or film substrate) thereof.

The image display device described may be an ELD device in which luminous substances such as zinc sulfide and diamines which emit light through the application of a voltage are deposited on a glass substrate by vapor deposition and display is performed by controlling a voltage applied to the substrate, or a CRT display device that converts electric signals to light to generate visible images. In this case, the image display device includes the anti-glare film on the outermost surface of each of the display devices or on the surface of a front plate thereof.

The anti-glare film of the present invention may be used for displays of televisions and computers. Particularly, it may be suitably used at the surfaces of high definition displays such as PDPs, ELDs, touch panels, and electronic paper.

Advantageous Effects of Invention

In the anti-glare film of the present invention, projections at positions corresponding to organic fine particles (A) in the surface of the diffusion layer are small in height and gently curved. Therefore, if the anti-glare film is used in a high definition display, an excellent anti-glare property, excellent prevention of white muddiness, and excellent prevention of scintillation can be achieved.

The impregnation layer described above is formed in the organic fine particles (A) in the diffusion layer. Since the radiation curable binder is mixed in the impregnation layer, the reflection at the interface between the organic fine particles (A) (impregnation layer) in the diffusion layer and the cured product of the radiation curable binder can be preferably reduced.

Further, the adhesion between the organic fine particles (A) in the diffusion layer and the cured product of the radiation curable binder is extremely excellent. Therefore, if the anti-glare film of the present invention is used in a sheet-like liquid crystal display, no cracks are generated at the interface between the organic fine particles (A) and the cured product of the radiation curable binder.

DESCRIPTION OF EMBODIMENTS

Figure 1:
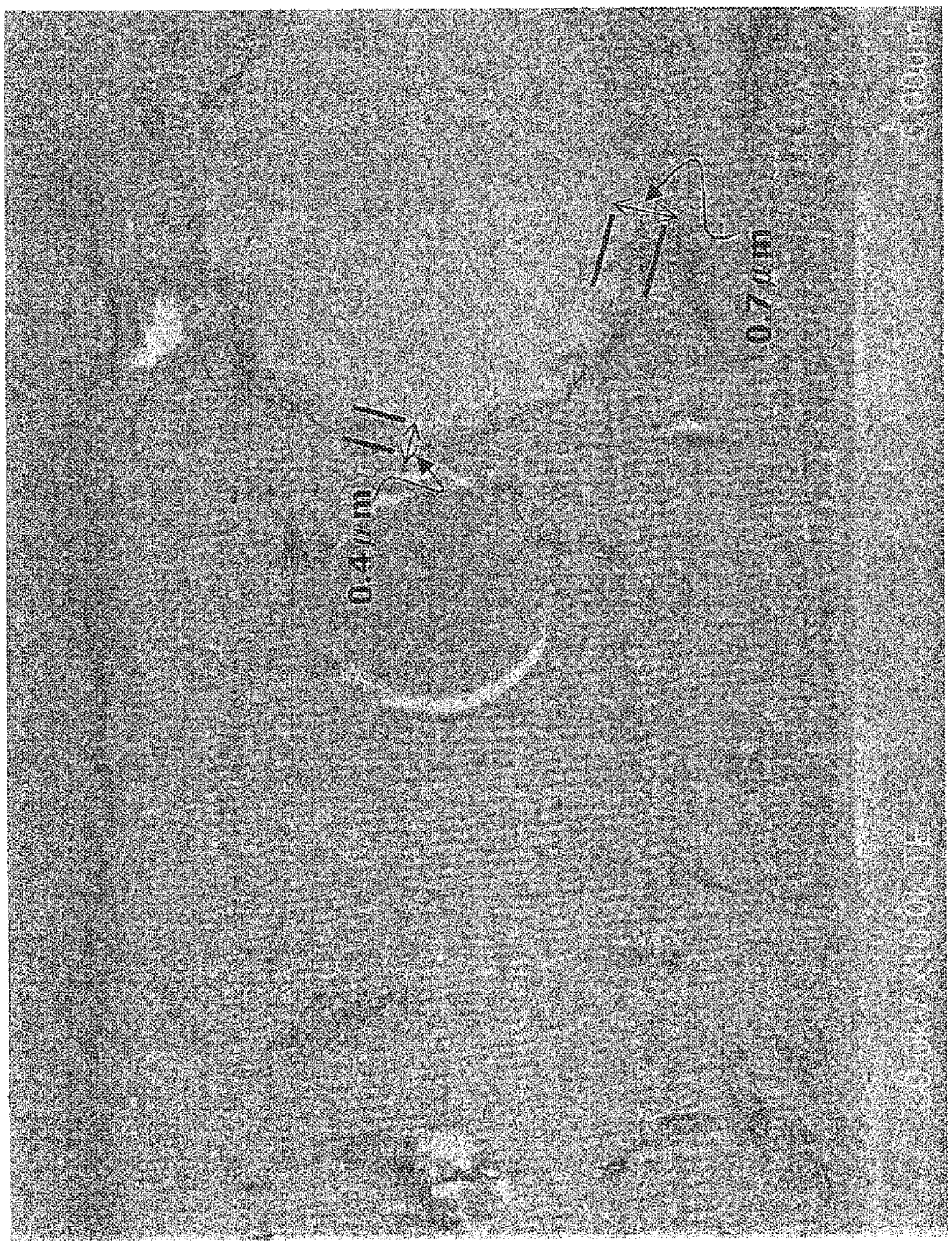
FIG. 1 is a cross-sectional SEM image of a diffusion layer of an anti-glare film in accordance with Example 1.

The present invention will be described by means of the following Examples which, however, are not intended to limit the scope of the present invention.

Example 1

First, triacetylcellulose (80 μm thickness, manufactured by FujiFilm Corp.) was prepared as a light transmitting substrate.
Next, a coating composition was prepared by mixing the following ingredients: a mixture of pentaerythritol triacrylate (PETA), dipentaerythritol hexaacrylate (DPHA), and polymethyl methacrylate (PMMA) (mass ratio: PETA/DPHA/PMMA=86/5/9) (refractive index after curing: 1.51) as a radiation curable binder; 1-hydroxy-cyclohexyl-phenyl-ketone (Irgacure 184, manufactured by BASF) as a photopolymerization initiator in an amount of 3 parts by mass based on 100 parts by mass of the binder solid content; acrylic particles (refractive index: 1.49, average particle size: 5.0 μm) as organic fine particles (A) in an amount of 9.0 parts by mass based on 100 parts by mass of the radiation curable binder; and a mixture of toluene and isopropyl alcohol (mass ratio: 7:3) as a solvent in an amount of 190 parts by mass based on 100 parts by mass of the radiation curable binder.
The resulting coating composition was allowed to stand for 24 hours, applied on the light-transmitting substrate using a meyer bar, and dried for 1 minute with dry air at 70° C. at a flow rate of 1.2 m/s.

The resulting coating was irradiated with ultraviolet rays (200 mJ/cm$^2$ under a nitrogen atmosphere) to cure the radiation curable binder, whereby a diffusion layer was formed. Thus, an anti-glare film was prepared. The thickness of the diffusion layer was 6.0 μm.

Examples 2 to 8

Anti-glare films were prepared in the same manner as Example 1, except that the ingredients of the coating composition and the time for allowing the coating composition to stand were set in accordance with Table 1.

Comparative Example 1

First, triacetylcellulose (80 μm thickness, manufactured by FujiFilm Corp.) was prepared as a light-transmitting substrate.
Next, a coating composition was prepared by mixing the following ingredients: a mixture (refractive index: 1.47) of a vinyl acetate resin (refractive index: 1.46) and a methyl methacrylate resin (refractive index: 1.49) (mass ratio; vinyl acetate resin/methyl methacrylate resin=60/40) as a binder; acrylic particles (refractive index: 1.49, average particle size: 5.0 μm) as organic fine particles (A) in an amount of 9.0 parts by mass based on 100 parts by mass of the binder; and a mixture of toluene and methyl ethyl ketone (mass ratio: 7:3) as a solvent in an amount of 190 parts by mass based on 100 parts by mass of the binder.
The resulting coating composition was allowed to stand for 24 hours, applied onto the light-transmitting substrate using a meyer bar, and dried for 1 minute with dry air at 70'C at a flow rate of 1.2 m/s. The thickness of the resulting coating was 6.0 μm.
Since both the vinyl acetate resin and the methyl methacrylate resin were non-reactive copolymers, the refractive index does not vary during the curing.

Comparative Examples 2 to 5

Anti-glare films were prepared in the same manner as Example 1, except that the ingredients of the coating composition and the time for allowing the coating composition to stand were set in accordance with Table 1.

TABLE 1

| | Binder | Organic fine particle (A) | | | Fine particle (B) | | | Lamellar inorganic compound | | Type of solvent | Time for allowing coating composition to stand (hour) |
| --- | --- | --- | --- | --- | --- | --- | --- | --- | --- | --- | --- |
| | | Type | Amount | $\Delta_A$ | Type | Amount | $\Delta_B$ | Type | Amount | | |
| Example 1 | Q | A | 9.0 | 0.02 | — | — | — | — | — | Z | 24 |
| Example 2 | P | A | 9.0 | 0.02 | — | — | — | M | 2.0 | Y | 24 |
| Example 3 | P | A | 6.0 | 0.02 | D | 5.0 | 0.09 | M | 2.0 | Y | 24 |
| Example 4 | P | A | 6.0 | 0.02 | E | 5.0 | 0.09 | M | 2.0 | Y | 24 |
| Example 5 | P | C | 6.0 | 0.02 | E | 5.0 | 0.09 | M | 2.0 | Y | 24 |
| Example 6 | P | A | 9.0 | 0.02 | — | — | — | — | — | Y | 24 |
| Example 7 | Q | A | 6.0 | 0.02 | F | 5.0 | 0.01 | M | 2.0 | Y | 24 |
| Example 8 | Q | A | 9.0 | 0.02 | — | — | — | — | — | Y | 48 |
| Comparative Example 1 | R | A | 9.0 | 0.02 | — | — | — | — | — | X | 24 |
| Comparative Example 2 | R | A | 6.0 | 0.02 | D | 5.0 | 0.13 | M | 2.0 | X | 24 |
| Comparative Example 3 | P | B | 9.0 | 0.02 | — | — | — | — | — | Y | 24 |
| Comparative Example 4 | Q | B | 9.0 | 0.02 | D | 5.0 | 0.09 | M | 2.0 | Y | 24 |
| Comparative Example 5 | Q | A | 9.0 | 0.02 | — | — | — | — | — | Y | 60 |

In Table 1, symbols showing the types of the organic fine particles (A), the fine particles (B), the radiation curable binder, and the solvent are described in detail below. Amounts (parts by mass) of the organic fine particles (A), the fine particles (B), and the lamellar inorganic compound are based on 100 parts by mass of the radiation curable binder.

Organic Fine Particle A

A: Low cross-linked acrylic particle (refractive index: 1.49, average particle size: 5.0 μm, manufactured by Soken Chemical & Engineering Co., Ltd.)

B: High cross-linked acrylic particle (refractive index: 1.49, average particle size: 5.0 μm, manufactured by Soken Chemical & Engineering Co., Ltd.)

C: Low cross-linked acrylic particle (refractive index: 1.49, average particle size: 3.5 μm, manufactured by Soken Chemical & Engineering Co., Ltd.)

Particle B

D: High cross-linked polystyrene particle (refractive index: 1.59, average particle size: 3.3 μm, manufactured by Soken Chemical & Engineering Co., Ltd.)

E: Low cross-linked polystyrene particle (refractive index: 1.59, average particle size: 5.0 μm, manufactured by Soken Chemical & Engineering Co., Ltd.)

F: High cross-linked acrylic-styrene particle (refractive index: 1.52, average particle size: 3.0 μm, manufactured by Soken Chemical & Engineering Co., Ltd.)

Lamellar Inorganic Compound

M: Talc (refractive index: 1.57, average particle size: 0.8 μm, manufactured by Nippon Talc Co., Ltd.)

Radiation Curable Binder

P: A mixture of pentaerythritol triacrylate (PETA), dipentaerythritol hexaacrylate (DPHA), and polymethyl methacrylate (PMMA) (Mass ratio: PETA/DPHA/PMMA=86/5/9) (refractive index after curing: 1.51)

Q: Pentaerythritol triacrylate (PETA) (refractive index after curing: 1.51)

R: A mixture of 60 parts by mass of a vinyl acetate resin and 40 parts by mass of a methyl methacrylate resin (refractive index 1.47) (refractive index does not vary during the curing because the mixture is a copolymer)

Solvent

X: A mixture of toluene and methyl ethyl ketone (mass ratio: 7:3)

Y: A mixture of toluene and methyl isobutyl ketone (mass ratio: 8:2)

Z: A mixture of toluene and isopropyl alcohol (mass ratio: 7:3)

The anti-glare films obtained in Examples and Comparative Examples were evaluated for the following criteria. Table 2 shows the results.

Thickness of Impregnation Layer

Figure 2:
FIG. 2 is a cross-sectional. SEM image of a diffusion layer of an anti-glare film in accordance with Example 2.
Figure 3:
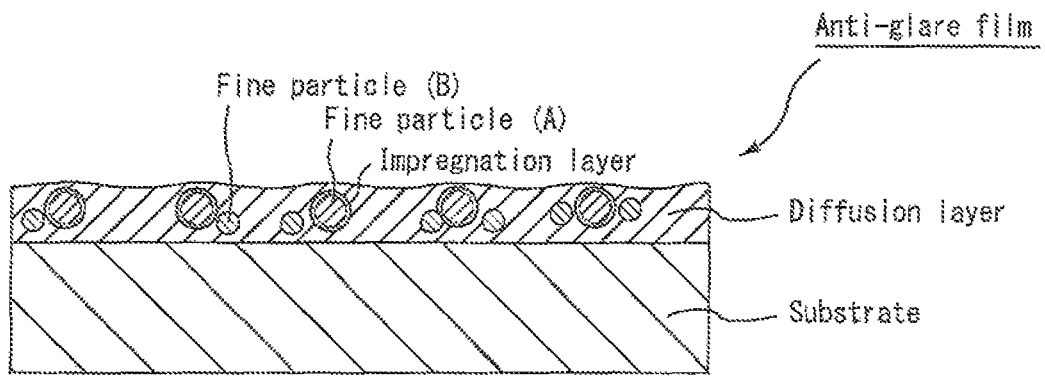
FIG. 3 is a schematic drawing of the anti-glare film according to the present invention.
Figure 4:
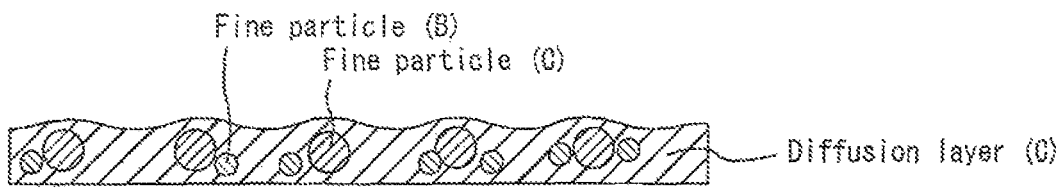
FIG. 4 is a schematic drawing of a diffusion layer (C).
Figure 5:
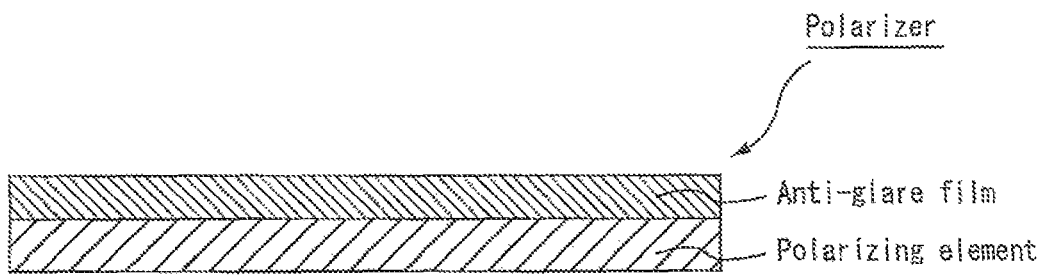
FIG. 5 is a schematic drawing of a Polarizer
Figure 6:
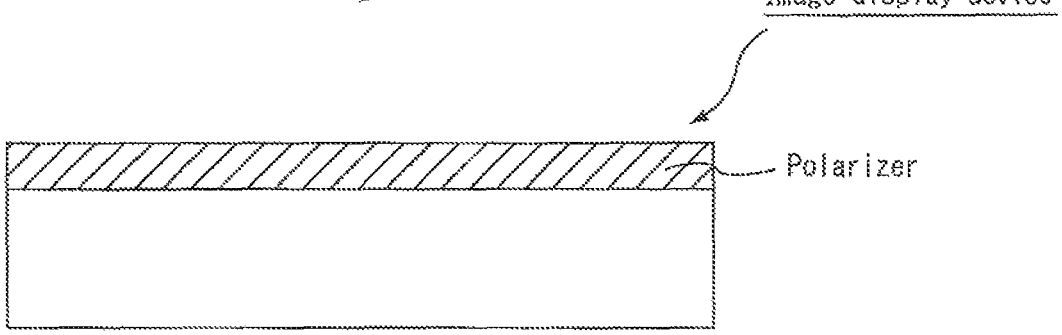
FIG. 6 is a schematic drawing of and Image display device.

The anti-glare films obtained in Examples and Comparative Examples were subjected to the following measurement. Each anti-glare film was cut in the thickness direction of a diffusion layer, the cross section thereof including at least one organic fine particle (A) was observed at 3000× to 50000× magnification using SEM, the thickness of a layer of the organic fine particle into which the radiation curable binder penetrates was measured at two points for each of five organic fine particles, and the average of the resulting 10 measurement values was calculated. The two points selected for the measurement were such that the interface between the particle (A) and the binder around the particle was relatively clearly observed and the amount of the radiation curable binder penetrating into the organic fine particle was the largest. FIG. 1 shows a cross-sectional SEM image of the diffusion layer of the anti-glare film in accordance with Example 1 FIG. 2 shows a cross-sectional SEM image of the diffusion layer of the anti-glare film in accordance with Example 2.

Even if the diffusion layer includes particles such as fine particles (B), the thickness of the impregnation layer of the particles can be measured by the same method for measurement of the organic fine particles (A).

Haze

The haze values of the anti-glare films obtained in Examples and Comparative Examples were determined using a haze meter HM-150 (manufactured by Murakami Color Research Laboratory Co., Ltd.) in accordance with the haze defined by JIS K 7136 (2000).

A haze variation during a 60° C., 90% RH, 1000-hour moisture and heat resistance test was determined for the anti-glare films obtained in Examples and Comparative Examples.

Mandrel Test

A mandrel test was performed for the anti-glare films obtained in Examples and Comparative Examples using a mandrel of φ6 mm, a mandrel of 8 mm diameter, and a mandrel of φ10 mm in accordance with JIS K5600-5-1 (1999). The films were evaluated according to the following criteria.

Excellent: no crack is generated in use of φ6 mm mandrel
Good: no crack is generated in use of φ8 mm mandrel
Fair: no crack is generated in use of φ10 mm mandrel
Poor: crack is generated in use of φ10 mm mandrel Contrast The anti-glare films obtained in Examples and Comparative Examples were each pasted on a black acrylic board using a transparent adhesion film for an optical film. The states of the anti-glare films are visually observed by 15 subjects from different angles and sensory evaluation was performed in a room with an illuminance of 1,000 Lx. Regeneration of black gloss was observed and evaluated according to the following criteria.

Excellent: Evaluation of "satisfactory" by at least 10 individuals.
Good: Evaluation of "satisfactory" by 6 to 9 individuals.
Fair: Evaluation of "satisfactory" by 5 to 7 individuals.
Poor: Evaluation of "satisfactory" by 4 or fewer individuals.

Scintillation

A polarizer on the outermost surface of a liquid crystal television "KDL-40X2500" produced by Sony Corporation was removed, and a polarizer with no surface coating was attached instead.

Then, the anti-glare films obtained in Examples and Comparative Examples were each attached over the polarizer so that the diffusion layer was the outermost surface. The file was attached using a transparent pressure-sensitive adhesive film for an optical film (product with total light transmittance of 91% or higher, haze of 0.3% or lower, and film thickness of 20 to 50 μm, for example, one of the MHM Series by Nichiei Kakoh Co., Ltd.).

The liquid crystal television was installed in a room with an illuminance of about 1,000 Lx, and a white screen was displayed thereon. The white screen was visually observed by 15 subjects at sites about 0.3 to 1.0 in distant from the liquid crystal television from different angles, for example, from right and left and from above and below. Thus, sensory evaluation was performed to evaluate scintillation of the white screen display in accordance with the following criteria.

Excellent: Evaluation of "satisfactory" by at least 10 individuals.
Good: Evaluation of "satisfactory" by 8 to 9 individuals.
Fair: Evaluation of "satisfactory" by 5 to 7 individuals.
Poor: Evaluation of "satisfactory" by 4 or fewer individuals.

Hard Coat Property

A pencil hardness test was conducted in accordance with JIS K5600-5-4 (1999) by drawing five lines with a 3H pencil under a load of 750 g on the surface of each anti-glare film obtained in Examples, Comparative Examples, and Reference Examples.

Excellent: no scratch was observed in 3H pencil hardness test
Good: 1 to 2 scratches were observed in 3H pencil hardness test.
Fair: 3 to 4 scratches were observed in 3H pencil hardness test
Poor: 5 scratches were observed in 3H pencil hardness test

TABLE 2

| | Organic fine particle (A) Impregnation layer thickness (μm) | $D_A2-D_A1$ | Impregnation layer thickness (μm) of fine particle (B) | Hz | Haze variation during moisture and heat resistance test | Mandrel test | Contrast | Scintillation | Hard coat property |
|---|---|---|---|---|---|---|---|---|---|
| Example 1 | 0.05 | 0.07 | — | 11.1 | 0.8 | Fair | Good | Fair | Good |
| Example 2 | 0.3 | 0.42 | — | 9.7 | 0.2 | Good | Excellent | Good | Excellent |
| Example 3 | 0.3 | 0.42 | 0 | 17.4 | 0.9 | Good | Good | Excellent | Good |
| Example 4 | 0.3 | 0.42 | 0.1 | 14.8 | 0.1 | Excellent | Excellent | Excellent | Excellent |
| Example 5 | 0.2 | 0.28 | 0.1 | 15.8 | 0.6 | Excellent | Fair | Good | Excellent |
| Example 6 | 0.3 | 0.42 | — | 10.5 | 0.3 | Good | Good | Fair | Good |
| Example 7 | 0.6 | 0.84 | 0 | 8.1 | 0.7 | Good | Fair | Fair | Good |
| Example 8 | 0.8 | 0.95 | — | 8.3 | 0.2 | Excellent | Good | Fair | Good |
| Comparative Example 1 | 0 | 0.00 | — | 13.4 | 6.4 | Poor | Fair | Fair | Poor |
| Comparative Example 2 | 0 | 0.00 | 0 | 19.3 | 4.1 | Poor | Fair | Excellent | Poor |
| Comparative Example 3 | 0 | 0.00 | — | 11.8 | 3.5 | Poor | Fair | Fair | Fair |
| Comparative Example 4 | 0 | 0.00 | 0 | 16.7 | 5.6 | Poor | Good | Good | Fair |
| Comparative Example 5 | 1.3 | 1.41 | — | 8.3 | 0.2 | Excellent | Excellent | Poor | Good |

As shown in Table 2, in the anti-glare films in accordance with Examples, the organic fine particles (A) in the diffusion layer have a radiation curable binder-containing impregnation layer with an average thickness of 0.05 to 0.8 μm. It was confirmed that the radiation curable binder is mixed in the impregnation layer. The haze variation of the anti-glare films according to Examples during a moisture and heat resistance test was 0.9% or less. The evaluation results of the mandrel test and scintillation of the film in Example 1, the evaluation results of the contrast of the films in Examples 5 and 7, and the evaluation results of the scintillation of the films in Examples 1, and 6 to 8 were "fair". However, the overall evaluation results of the mandrel test, contrast, and scintillation were favorable.

An impregnation layer was not formed in the organic fine particles (A) in the diffusion layer of the anti-glare films in accordance with Comparative Examples 1 to 4. Therefore, all the evaluation results of the haze variation during a moisture and heat resistance test, the mandrel test, the contrast, and the scintillation were not so good. The impregnation layer with a thickness of 1.3 μm was formed in the organic fine particles (A) in the diffusion layer of the anti-glare film in accordance with Comparative Example 5. However, the anti-glare film was poor in scintillation.

INDUSTRIAL APPLICABILITY

The anti-glare film of the present invention can be preferably used in cathode ray tubes (CRTs), liquid crystal displays (LCDs), plasma displays (PDPs), electroluminescence displays (ELDs), and displays of touch panels and electronic paper, and particularly used in high definition displays.

The invention claimed is:
1. An anti-glare film, comprising:
a light-transmitting substrate; and
a diffusion layer having a surface roughness and provided on at least one surface of the light-transmitting substrate,
wherein the diffusion layer is obtainable by applying, on the at least one surface of the light-transmitting substrate, a coating composition including organic fine particles (A) and a radiation curable binder that includes a (meth)acrylate monomer as an essential component, drying the coating composition to form a coating, and curing the coating,
the organic fine particles (A) in the diffusion layer each have an impregnation layer that is impregnated with the radiation curable binder, and
the impregnation layer has an average thickness of 0.05 to 1.0 μm.
2. The anti-glare film according to claim 1,
wherein a haze variation during a 60° C., 90% RH, 1000-hour moisture and heat resistance test is 1.5% or less.
3. The anti-glare film according to claim 2,
wherein the diffusion layer further includes fine particles (B) with an average particle size of smaller than an average particle size of the organic fine particles (A).
4. The anti-glare film according to claim 2
wherein the coating composition includes at least a solvent that swells the organic fine particles (A).
5. The anti-glare film according to claim 1,
wherein the diffusion layer further includes fine particles (B) with an average particle size of smaller than an average particle size of the organic fine particles (A).
6. The anti-glare film according to claim 5,
wherein $\Delta_A$ and $\Delta_B$ satisfy the formula (1):

$$|\Delta_A|<|\Delta_B| \quad (1)$$

wherein $\Delta_A$ represents a difference between a refractive index of the radiation curable binder and a refractive index of the organic fine particles (A) and $\Delta_B$ represents a difference between a refractive index of the radiation curable binder and a refractive index of the fine particles (B).
7. The anti-glare film according to claim 6,
wherein $D_A1$ and $D_A2$ satisfy the formula (2):

$$0.01 \, \mu m < D_A2 - D_A1 < 1.0 \, \mu m \quad (2)$$

wherein $D_A1$ represents an average particle size of the organic fine particles (A) and $D_A2$ represents an average particle size of the organic fine particles (A) in the diffusion layer.
8. The anti-glare film according to claim 5,
wherein $D_A1$ and $D_A2$ satisfy the formula (2):

$$0.01 \, \mu m < D_A2 - D_A1 < 1.0 \, \mu m \quad (2)$$

wherein $D_A1$ represents an average particle size of the organic fine particles (A) and $D_A2$ represents an average particle size of the organic fine particles (A) in the diffusion layer.

9. The anti-glare film according to claim 5,
wherein $D_A1$, $D_B1$, $D_A2$, and $D_B2$ satisfy the formula (3):

$$1.0\ \mu m > D_A2 - D_A1 \geq D_B2 - D_B1 \geq 0 \quad (3)$$

wherein $D_A1$ represents an average particle size of the organic fine particles (A), $D_B1$ represents an average particle size of the fine particles (B), $D_A2$ represents an average particle size of the organic fine particles (A) in the diffusion layer, and $D_B2$ represents an average particle size of the fine particles (B) in the diffusion layer.

10. The anti-glare film according to claim 5,
wherein the fine particles (B) are organic fine particles.

11. The anti-glare film according to claim 5
wherein the coating composition includes at least a solvent that swells the organic fine particles (A).

12. The anti-glare film according to claim 1,
wherein the coating composition includes at least a solvent that swells the organic fine particles (A).

13. The anti-glare film according to claim 12,
wherein $\Delta_A$ and $\Delta_B$ satisfy the formula (1):

$$|\Delta_A| < |\Delta_B| \quad (1)$$

wherein $\Delta_A$ represents a difference between a refractive index of the radiation curable binder and a refractive index of the organic fine particles (A) and $\Delta_B$ represents a difference between a refractive index of the radiation curable binder and a refractive index of the fine particles (B).

14. The anti-glare film according to claim 12,
wherein $D_A1$ and $D_A2$ satisfy the formula (2):

$$0.01\ \mu m < D_A2 - D_A1 < 1.0\ \mu m \quad (2)$$

wherein $D_A1$ represents an average particle size of the organic fine particles (A) and $D_A2$ represents an average particle size of the organic fine particles (A) in the diffusion layer.

15. The anti-glare film according to claim 1,
wherein the diffusion layer further includes a lamellar inorganic compound.

16. The anti-glare film according to claim 15,
wherein the lamellar inorganic compound is talc.

17. A polarizer provided with a polarizing element, the polarizer comprising the anti-glare film according to claim 1, provided on a surface of the polarizing element.

18. An image display device, comprising the anti-glare film according to claim 1, or a polarizer comprising said anti-glare film according to claim 17 on an outermost surface of the image display device.

19. A method for producing an anti-glare film that includes a light-transmitting substrate and a diffusion layer having a surface roughness and provided on least one surface of the light-transmitting substrate,
the method comprising forming the diffusion layer by applying, on the at least one surface of the light-transmitting substrate, a coating composition including organic fine particles (A), a radiation curable binder that includes a (meth)acrylate monomer as an essential component, and a solvent; drying the coating composition to form a coating; and curing the coating,
the radiation curable binder or the solvent or both including a component that swells the organic fine particles (A),
the organic fine particles (A) each having an impregnation layer that is impregnated with the radiation curable binder and has an average thickness of 0.05 to 1.0 μm,
anti-glare films are prepared using coating compositions including organic fine particles with different cross-linking degrees, and organic fine particles achieving a suitable impregnation degree are selected from these as the organic particle (A).

* * * * *